United States Patent
Phillips

(10) Patent No.: US 11,748,057 B2
(45) Date of Patent: Sep. 5, 2023

(54) SYSTEM AND METHOD FOR PERSONALIZATION IN INTELLIGENT MULTI-MODAL PERSONAL ASSISTANTS

(71) Applicant: SAMSUNG ELECTRONICS CO., LTD., Suwon-si (KR)

(72) Inventor: Caleb Ryan Phillips, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 17/079,111

(22) Filed: Oct. 23, 2020

(65) Prior Publication Data

US 2021/0264134 A1    Aug. 26, 2021

Related U.S. Application Data

(60) Provisional application No. 62/981,850, filed on Feb. 26, 2020.

(51) Int. Cl.
*G06V 40/00* (2022.01)
*G06V 40/16* (2022.01)
(Continued)

(52) U.S. Cl.
CPC ............ *G06F 3/167* (2013.01); *G06N 20/00* (2019.01); *G06V 10/80* (2022.01); *G06V 20/10* (2022.01); *G06V 40/172* (2022.01); *G10L 17/22* (2013.01)

(58) Field of Classification Search
USPC ........ 382/103, 115–119, 155–160, 224–229; 704/1–275; 706/14–25, 45–60
See application file for complete search history.

(56) References Cited

U.S. PATENT DOCUMENTS

| 10,565,434 B2 | 2/2020 | Vemulapalli et al. |
| 10,812,921 B1 * | 10/2020 | Hinthorn ............... H04R 3/005 |
| 11,468,895 B2 * | 10/2022 | Yoshioka ............... G06Q 10/10 |

(Continued)

FOREIGN PATENT DOCUMENTS

| JP | 2018-18184 A | 2/2018 |
| KR | 10-0684160 B1 | 2/2007 |

(Continued)

OTHER PUBLICATIONS

Na, Seung Won; resource sharing system and method for augmenting resource sharing; Jul. 5, 2005 (Year: 2005).*

(Continued)

*Primary Examiner* — Marcellus J Augustin
(74) *Attorney, Agent, or Firm* — Sughrue Mion, PLLC

(57) ABSTRACT

A method may include receiving, by a virtual assistant of a user device, an input from a user, the virtual assistant being based on software. The method may include obtaining, by the virtual assistant of the user device and via a sensor of the user device, audio information or video information of the user. The method may include determining, by the virtual assistant of the user device, an identity of the user based on the audio information or the video information of the user and a set of facial embeddings and speech embeddings that is correlated with the user, the set of facial embeddings and speech embeddings being generated using a facial embedding model, a speech embedding model, and a sound source localization model. The method may include performing, by the virtual assistant of the user device, an action based on the input and the identity of the user.

20 Claims, 13 Drawing Sheets

(51) Int. Cl.
  *G10L 21/028* (2013.01)
  *G10L 21/0308* (2013.01)
  *G10L 25/30* (2013.01)
  *G06F 3/16* (2006.01)
  *G06F 16/2458* (2019.01)
  *G06F 16/248* (2019.01)
  *G06N 20/00* (2019.01)
  *G10L 17/22* (2013.01)
  *G06V 10/80* (2022.01)
  *G06V 20/10* (2022.01)

(56) References Cited

U.S. PATENT DOCUMENTS

| | | | |
|---|---|---|---|
| 2018/0286401 A1 | 10/2018 | Oh et al. | |
| 2019/0087152 A1 | 3/2019 | Aggarwal et al. | |
| 2019/0114467 A1 | 4/2019 | Liang et al. | |
| 2019/0341050 A1* | 11/2019 | Diamant | H04N 7/147 |
| 2019/0341054 A1* | 11/2019 | Krupka | H04N 7/15 |
| 2019/0348040 A1 | 11/2019 | Mann et al. | |
| 2021/0243252 A1* | 8/2021 | Delaney | G06V 20/64 |
| 2022/0021985 A1* | 1/2022 | Wexler | G10L 25/51 |

FOREIGN PATENT DOCUMENTS

| | | |
|---|---|---|
| KR | 10-2013-0115749 A | 10/2013 |
| KR | 10-1421952 B1 | 7/2014 |
| KR | 10-1787147 B1 | 10/2017 |
| WO | 2019/104229 A1 | 5/2019 |

OTHER PUBLICATIONS

Communication dated Jun. 10, 2021, issued by the International Searching Authority in counterpart International Application No. PCT/KR2021/002052 (PCT/ISA/220, 210, 237).

Cao et al., "VGGFace2: A dataset for recognising faces across pose and age," IEEE, 2018 13th IEEE International Conference on Automatic Face & Gesture Recognition, May 2018, Total 11 pages.

Cramer et al., "Look, Listen, and Learn More: Design Choices for Deep Audio Embeddings," 2019 IEEE International Conference on Acoustics, Speech and Signal Processing, May 2019, Total 5 pages.

Vera-Diaz et al., "Towards End-to-End Acoustic Localization using Deep Learning: from Audio Signal to Source Position Coordinates," Sensors, vol. 18, No. 10, 2018, Total 18 pages.

* cited by examiner

SYSTEM AND METHOD FOR PERSONALIZATION IN INTELLIGENT MULTI-MODAL PERSONAL ASSISTANTS

CROSS-REFERENCE TO RELATED APPLICATION(S)

This application is based on and claims priority under 35 U.S.C. § 119 to U.S. Provisional Patent Application No. 62/981,850, filed on Feb. 26, 2020, in the U.S. Patent & Trademark Office, the disclosure of which is incorporated by reference herein in its entirety.

BACKGROUND

1. Field

The disclosure relates to a system and method for personalization in intelligent multi-modal personal assistants.

2. Description of Related Art

A user can utilize a virtual assistant service (e.g., an intelligent virtual assistant (IVA), an intelligent personal assistant (IPA), or the like) via a user device (e.g., a smartphone, a hub device, or the like). Typically, the virtual assistant is configured to respond to inquiries, commands, etc. of a single pre-defined user. Accordingly, the virtual assistant is not configured to identify the identity of the user and/or the relationships between the user and other users or objects. As such, conventional virtual assistants are incapable of servicing inputs from different users in a context-aware and relational manner.

SUMMARY

According to an aspect of an example embodiment, a method may include receiving, by a virtual assistant of a user device, an input from a user, the virtual assistant being based on software; obtaining, by the virtual assistant of the user device and via a sensor of the user device, audio information or video information of the user; determining, by the virtual assistant of the user device, an identity of the user based on the audio information or the video information of the user and a set of facial embeddings and speech embeddings that is correlated with the user, the set of facial embeddings and speech embeddings being generated using a facial embedding model, a speech embedding model, and a sound source localization model; and performing, by the virtual assistant of the user device, an action based on the input and the identity of the user.

According to an aspect of an example embodiment, a user device may include a memory configured to store instructions; and a processor configured to: execute the instructions to receive an input from a user; obtain, via a sensor of the user device, audio information or video information of the user; determine an identity of the user based on the audio information or the video information of the user and a set of facial embeddings and speech embeddings that is correlated with the user, the set of facial embeddings and speech embeddings being generated using a facial embedding model, a speech embedding model, and a sound source localization model; and perform an action based on the input and the identity of the user.

According to an aspect of an example embodiment, a non-transitory computer-readable medium may store one or more instructions that, when executed by one or more processors of a user device, cause the one or more processors to: receive an input from a user; obtain, via a sensor of the user device, audio information or video information of the user; determine an identity of the user based on the audio information or the video information of the user and a set of facial embeddings and speech embeddings that is correlated with the user, the set of facial embeddings and speech embeddings being generated using a facial embedding model, a speech embedding model, and a sound source localization model; and perform an action based on the input and the identity of the user.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

Figure 1:
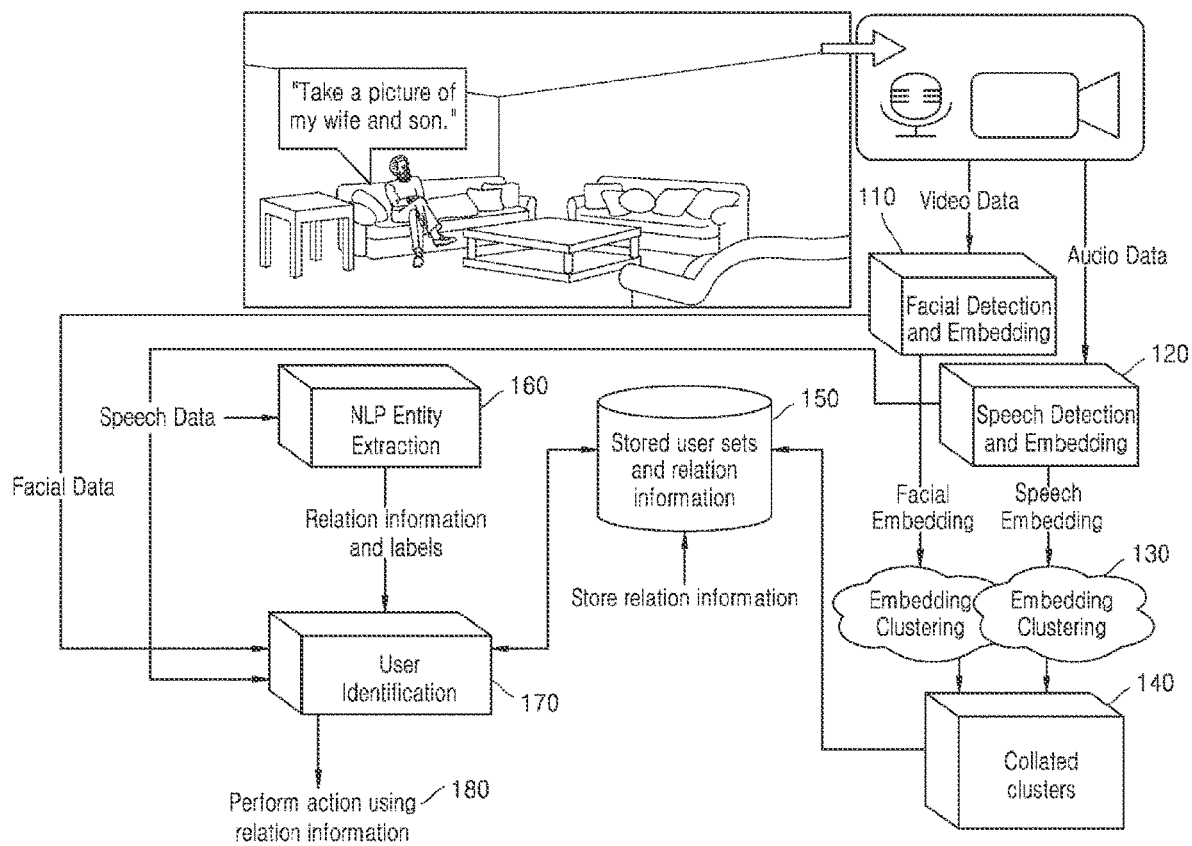
FIG. 1 is a diagram of an overview of personalization in intelligent multi-modal personal assistants according to an embodiment.

FIG. 1 is a diagram of an overview of personalization in intelligent multi-modal personal assistants according to an embodiment.

As shown in FIG. 1, a virtual assistant of a user device (e.g., a smart hub) may obtain video information and audio information of users of a particular environment (e.g., a home).

As shown by reference number 110, the user device may perform facial detection and facial embedding, based on the video information. For example, the user device may detect respective facial data of the users, and generate, using a facial embedding model, facial embeddings of the users.

Further, as shown by reference number 120, the user device may perform speech detection and speech embedding, based on the audio information. For example, the user device may detect speech data of the respective users, and generate, using a speech embedding model, speech embeddings of the users.

As shown by reference number 130, the user device may perform embedding clustering to cluster the facial embeddings and the speech embeddings, respectively. Further, as shown by reference number 140, the user device may collate, using a sound source localization model, the clusters of facial embeddings and speech embeddings such that the facial embeddings of a particular user are collated with the respective speech embeddings of the particular user.

As shown by reference number 150, the user device may store user sets for the users, and relation information for the users. A "user set," as used herein, may refer to a set of information including one or more facial embeddings, one or more speech embeddings, and one or more labels of a particular user. "Relation information," as used herein, may refer to information that identifies a relationship between a set of users.

In this way, and as described below, the user device may use the stored user sets to determine identities of the respective users and/or relationships between the respective users when responding to commands.

For instance, as shown, the virtual assistant of the user device may receive an input of "Take a picture of my wife and son" from a user. As shown by reference number 160, the user device may perform one or more natural language processing (NLP) techniques, such as entity extraction, using the speech input to identify entities referenced in the speech input.

The user device may obtain video information of the user that input the speech input, and as shown by reference number 170, may perform user identification. For example, the user device may generate, using the facial embedding model, a facial embedding based on facial data included in the video information. The user device may compare the facial embedding with stored facial embeddings of the user sets, and identify a user including a facial embedding that has a high similarity to the facial embedding. In this way, the user device may determine an identity of the user that input the speech input, based on the stored user sets.

Based on determining the identity of the user, and as shown by reference number 180, the user device may perform an action using relation information. For example, the user device may use stored relation information that identifies relationships between the user and various other users (e.g., the user's wife, the user's son, etc.) to identify the identity of the user's wife and the user's son which were named entities in the speech input. Further, the user device may perform the action of capturing an image of the user's wife and son, as requested by the speech input.

Figure 2:
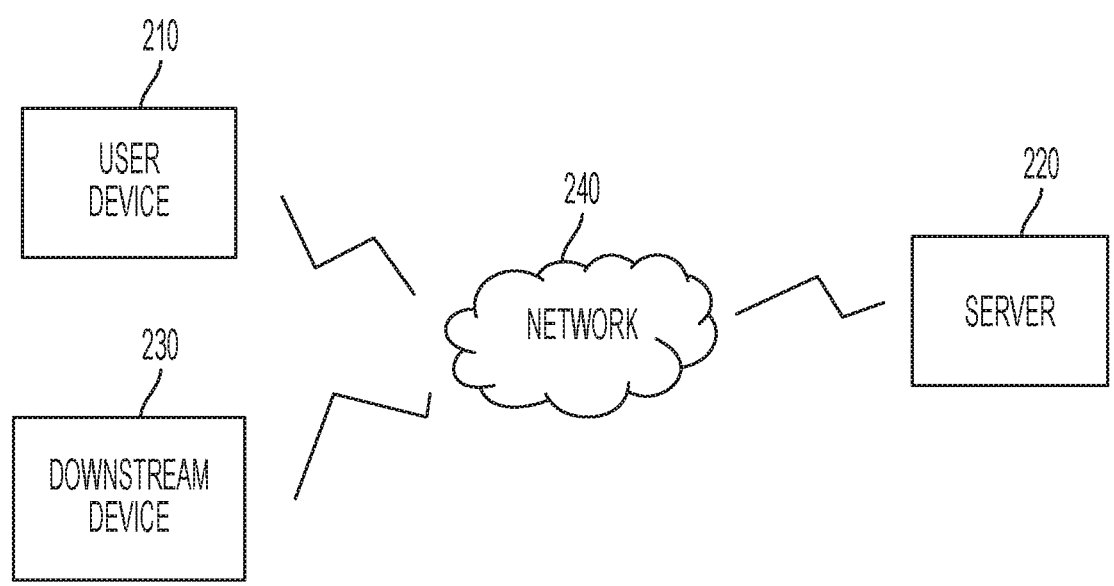
FIG. 2 is a diagram of a system for personalization in intelligent multi-modal personal assistants according to an embodiment.

FIG. 2 is a diagram of a system for personalization in intelligent multi-modal personal assistants according to an embodiment.

As shown in FIG. 2, a system may include a user device 210, a server 220, a downstream device 230, and a network 240.

User device 210 may include one or more devices configured to provide a virtual assistant service. For example, the user device 210 may include a computing device (e.g., a desktop computer, a laptop computer, a tablet computer, a handheld computer, a smart speaker, a smart hub, a server, etc.), a mobile phone (e.g., a smart phone, a radiotelephone, etc.), a smart hub, a smart appliance, a smart home device, an Internet of Things device, a wearable device (e.g., a pair of smart glasses or a smart watch), or a similar device.

The server 220 may include one or more devices configured to communicate with the user device 210. For example, the server 220 may include a server, a cloud server, a computing resource, a virtual machine, a virtualized storage, a hypervisor, a user device, or a similar device.

The downstream device 230 may include one or more devices configured to communicate with the user device 210. For example, the downstream device 230 may include a computing device (e.g., a desktop computer, a laptop computer, a tablet computer, a handheld computer, a smart speaker, a server, etc.), a mobile phone (e.g., a smart phone, a radiotelephone, etc.), a smart hub, a smart appliance, a smart home device, an Internet of Things device, a wearable device (e.g., a pair of smart glasses or a smart watch), or a similar device.

The network 240 may include one or more wired and/or wireless networks. For example, network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
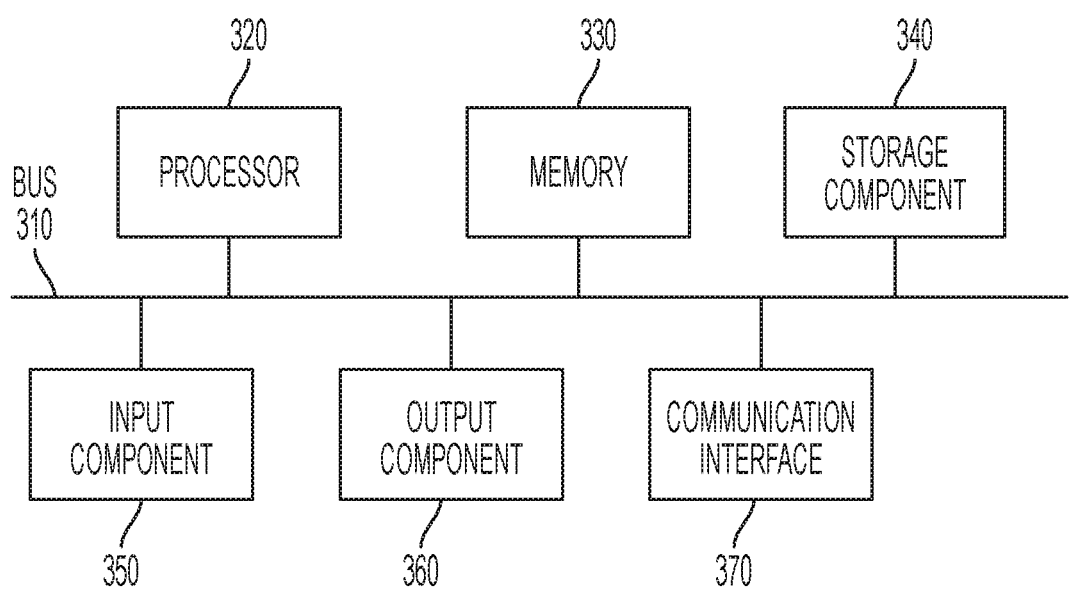
FIG. 3 is a diagram of components of one or more devices of FIG. 2 according to an embodiment.

FIG. 3 is a diagram of components of one or more devices of FIG. 2 according to an embodiment.

FIG. 3 is a diagram of example components of a device 300. Device 300 may correspond to user device 210, server 220, and/or downstream device 230. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. According to an embodiment, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
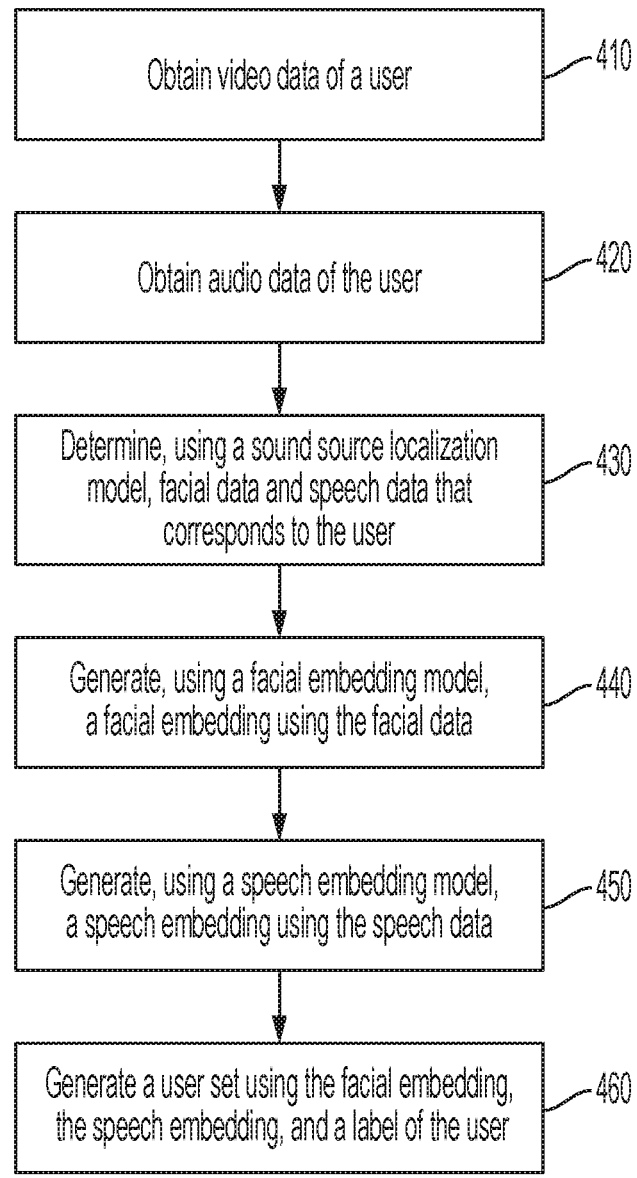
FIG. 4 is a flowchart of an example process of generating a user set according to an embodiment.

FIG. 4 is a flowchart of an example process of generating a user set according to an embodiment.

According to an embodiment, one or more operations of FIG. 4 may be performed by the user device 210. Alternatively, one or more operations of FIG. 4 may be performed by another device or a group of devices separate from or including the user device 210, such as the server 220 and/or the downstream device 230.

As shown in FIG. 4, the process may include obtaining video data of a user (operation 410). For example, the user device 210 may obtain, via a camera of the user device 210, video data of the user in order to generate a user set for the user. The user device 210 may obtain the video data of the user based on detecting an event, based on performing an initial setup procedure, based on an occurrence of a predetermined timeframe, based on receiving permission from the user, based on detecting an interaction of the user with the user device 210, based on detecting the user in proximity to the user device 210, or the like.

As further shown in FIG. 4, the process may include obtaining audio data of the user (operation 420). For example, the user device 210 may obtain, via a microphone of the user device 210, audio data of the user in order to generate a user set for the user. The user device 210 may obtain the audio data of the user based on detecting an event, based on performing an initial setup procedure, based on an occurrence of a predetermined timeframe, based on receiving permission from the user, based on detecting an interaction of the user with the user device 210, based on detecting the user in proximity to the user device 210, or the like.

The user device 210 may obtain the audio data and the video data simultaneously, substantially concurrently, in a partially overlapping manner, in a non-overlapping manner, or the like.

As further shown in FIG. 4, the process may include determining, using a sound source localization model, facial data and speech data that corresponds to the user (operation 430). For example, the user device 210 may determine, using a sound source localization model, facial data and speech data that corresponds to the user in order to generate a user set for the user.

The sound source localization model may be a model that is configured to determine facial data and speech data that belongs to the same underlying user. For example, the sound source localization model may receive an input of facial data and speech data, may determine facial data and speech data that belongs to the same underlying user, and may generate an output that identifies the facial data and the speech data that belongs to the same underlying user. The sound source localization model may use a time-difference-of-arrival (TDOA) technique, a spectral analysis technique, an interaural time difference (ITD) technique, a maximum likelihood technique, a multiple signal classification technique, an acoustic vector sensor (AVS) technique, a cross-power spectrum phase (CSP) analysis technique, or the like.

The user device 210 may input the facial data obtained from the video data into the sound source localization model, and may input the speech data obtained from the audio data into the sound source localization model. Further, the user device 210 may determine, based on an output from the sound source localization model, facial data and speech data that corresponds to the user in order to generate a user set for the user.

As further shown in FIG. 4, the process may include generating, using a facial embedding model, a facial embedding using the facial data (operation 440). For example, the user device 210 may generate, using a facial embedding model, a facial embedding using the facial data in order to generate a user set for the user.

The facial embedding model may be a model that is configured to generate a facial embedding based on facial data. For example, the facial embedding model may receive an input of facial data, may generate a facial embedding based on the facial data, and may output the facial embedding. The facial embedding may be a low-dimensional representation of facial data. For example, the facial embedding may be a low-dimensional vector in an embedding space.

As further shown in FIG. 4, the process may include generating, using a speech embedding model, a speech embedding using the speech data (operation 450). For example, the user device 210 may generate, using a speech embedding model, a speech embedding using the speech data in order to generate a user set for the user.

The speech embedding model may be a model that is configured to generate a speech embedding based on speech data. For example, the speech embedding model may receive an input of speech data, may generate a speech embedding based on the speech data, and may output the speech embedding. The speech embedding may be a low-dimensional representation of speech data. For example, the speech embedding may be a low-dimensional vector in an embedding space.

As further shown in FIG. 4, the process may include generating a user set using the facial embedding, the speech embedding, and a label of the user (operation 460). For example, the user device 210 may generate a user set that includes the facial embedding, the speech embedding, and a label of the user. As used herein, a "user set" may refer to a collection of a facial embedding, a speech embedding, and a label of the user. The user device 210 may generate a user set for a user, and store the user set.

Further, the user device 210 may obtain additional video data and/or audio data of the user, and update the user set by repeating the operations of FIG. 4. For example, the user device 210 may generate a plurality of facial embeddings of the user. The plurality of facial embeddings of the user may form a cluster in the embedding space. Additionally, the user device 210 may generate a plurality of speech embeddings of the user. The speech embeddings of the user may form a cluster in the embedding space.

Additionally, the user set may include one or more labels associated with the user. A label may be an identifier of a user. For example, a label may be "1234," "user 1," "mom," "dad," "daughter," "son," "John," "Elle," or the like. The user device 210 may determine a confidence score associated with a label, store the confidence score, and update the confidence score. For example, a confidence score may be "0.1," "1.0," 10," "low," "medium, "high," etc.

The user device 210 may generate a user set for a user, and may store the user set. The user device 210 may store n user sets, such as a first user set associated with a first user, a second user set associated with a second user, and an n-th user set associated with an n-th user.

Although FIG. 4 describes the operations 410 through 460 as being performed by the user device 210, it should be understood that the server 220 may perform some, or all, of the operations described in FIG. 4. Further, in this case, the server 220 may generate the user set, and provide the user set to the user device 210 for storage.

Further, FIG. 4 describes one or more models. In some implementations, the user device 210 may train the one or more models, store the one or more trained models, use the one or more trained models, and update the one or more models.

Additionally, or alternatively, the server 220 may train the one or more models, store the one or more trained models, use the one or more trained models, update the one or more models, and/or provide the one or models to the user device 210.

Although FIG. 4 shows example operations, according to an embodiment, the process may include additional operations, fewer operations, different operations, or differently arranged operations than those depicted in FIG. 4. Additionally, or alternatively, two or more of the operations of the process may be performed in parallel.

Figure 5:
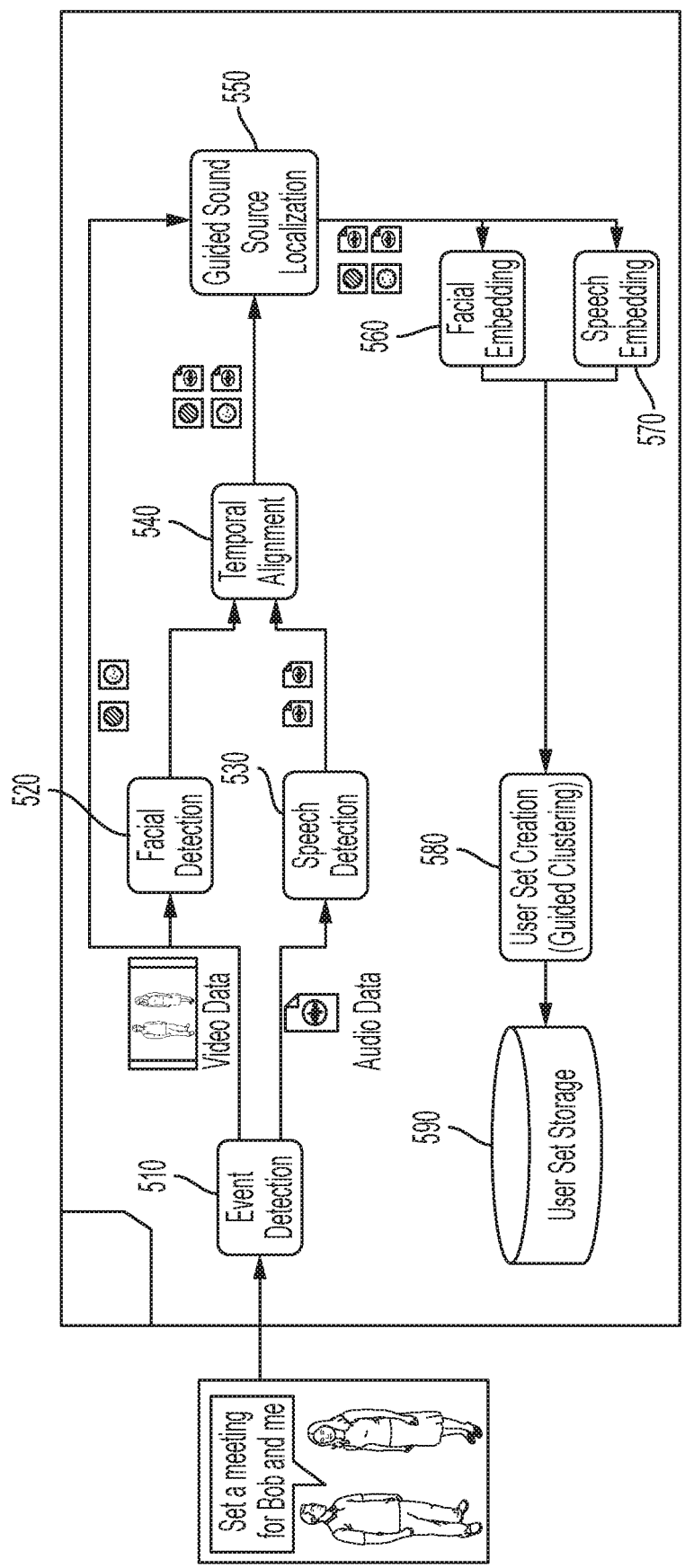
FIG. 5 is a diagram of an example process of generating a user set according to an embodiment.

FIG. 5 is a diagram of an example process of generating a user set according to an embodiment.

As shown in FIG. 5, a first user and a second user may be disposed within proximity of a user device 210. Further, as shown, the first user may input the command of "Set a meeting for Bob and me." As shown by reference number 510, the user device 210 may detect an event based on the input from the first user. The user device 210 may obtain video data and audio data of the first user and the second user, based on the detected event.

As shown by reference number 520, the user device 210 may perform facial detection using the video data, and identify facial data of the first user and facial data of the second user. As shown by reference number 530, the user device 210 may perform speech detection using the audio data, and identify speech data of the first user and speech data of the second user. As shown by reference number 540, the user device 210 may perform temporal alignment using the facial data and the speech data, and generate temporally aligned facial data and speech data.

As shown by reference number 550, the user device 210 may input the facial data obtained from the video data into the sound source localization model, and may input the speech data obtained from the audio data into the sound source localization model. Further, the user device 210 may determine, based on an output of the sound source localization model, facial data and speech data that corresponds to the first user, and facial data and speech data that corresponds to the second user.

As shown by reference number 560, the user device 210 may generate, using a facial embedding model, a facial embedding using the facial data of the first user. Further, the user device 210 may generate, using the facial embedding model, a facial embedding using the facial data of the second user. As shown by reference number 570, the user device 210 may generate, using a speech embedding model, a speech embedding using the speech data of the first user. Further, the user device 210 may generate, using the speech embedding model, a speech embedding using the speech data of the second user.

As shown by reference number 580, the user device 210 may generate a user set for the first user by using the facial embedding of the first user, the speech embedding of the first user, and a label of the first user. Further, the user device 210 may generate a user set for the second user by using the facial embedding of the second user, the speech embedding of the second user, and a label of the second user. As shown by reference number 590, the user device 210 may store the user set of the first user, and store the user set of the second user.

Figure 6:
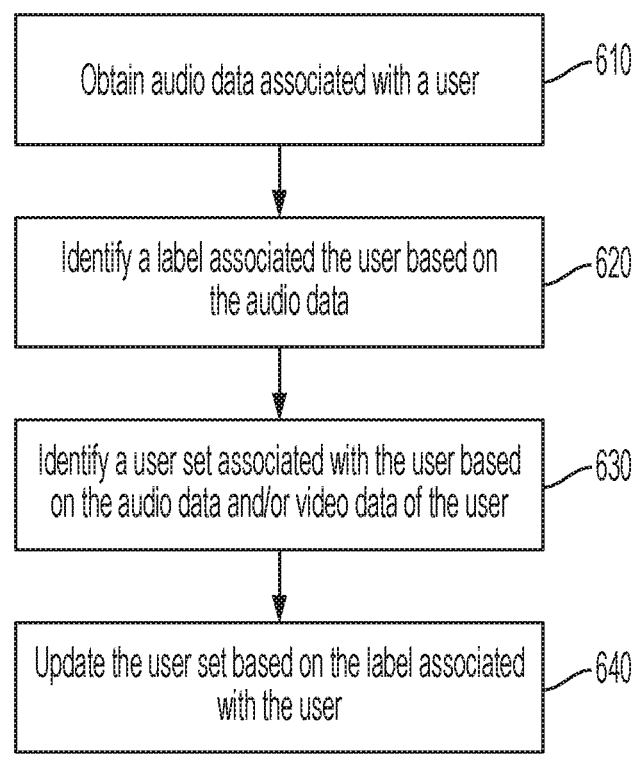
FIG. 6 is a flowchart of an example process of updating a user set based on a label associated with a user according to an example embodiment.

FIG. 6 is a flowchart of an example process of updating a user set based on a label associated with a user according to an example embodiment.

According to an embodiment, one or more operations of FIG. 6 may be performed by the user device 210. According to an embodiment, one or more operations of FIG. 6 may be performed by another device or a group of devices separate from or including the user device 210, such as the server 220 and/or the downstream device 230.

As shown in FIG. 6, the process may include obtaining audio data associated with a user (operation 610). For example, the user device 210 may obtain, via a microphone of the user device 210, audio data associated with user. The audio data associated with the user may be speech data of the user, speech data of another user that is conversing with the user, or the like. The speech data associated with the user may include one or more words that identify the user.

As further shown in FIG. 6, the process may include identifying a label associated with the user based on the audio data (operation 620). For example, the user device 210 may perform one or more natural language processing techniques (e.g., automatic speech recognition (ASR), entity extraction, etc.) using the speech data, and identify a label associated with the user based on performing the one or more natural language processing techniques.

As further shown in FIG. 6, the process may include identifying a user set associated with the user based on the audio data and/or video data of the user (operation 630). For example, the user device 210 may identify a user set associated with the user.

In some implementations, the user device 210 may identify a user set associated with the user based on the audio data. For example, the user device 210 may identify a label associated with the user based on the audio data, and identify a user set that includes the identified label.

Additionally, or alternatively, the user device 210 may generate, using the speech embedding model, a speech embedding using the speech data of the user. Further still, the user device 210 may compare the speech embedding with speech embeddings of stored user sets, and determine similarity scores between the speech embedding and the speech embeddings. The user device 210 may identify a user set associated with the user based on the determined similarity scores. For example, the user device 210 may identify a user set having a speech embedding that includes the highest similarity score in relation to the speech embedding, includes a threshold similarity score in relation to the speech embedding, or the like.

Alternatively, the user device 210 may identify a user set associated with the user based on video data. For example, the user device 210 may obtain, via a camera of the user device 210, video data of the user. Further, the user device 210 may generate, using the facial embedding model, a facial embedding using the video data of the user. Further still, the user device 210 may compare the facial embedding with facial embeddings of stored user sets, and determine similarity scores between the facial embedding and the facial embeddings. The user device 210 may identify a user set associated with the user based on the determined similarity scores. For example, the user device 210 may identify a user set having a facial embedding that includes the highest similarity score in relation to the facial embedding, includes a threshold similarity score in relation to the facial embedding, or the like.

As further shown in FIG. 6, the process may include updating the user set based on the label associated with the user (operation 640). For example, the user device 210 may update the user set by adding the label to the user set.

Although FIG. 6 shows example operations, according to an embodiment, the process may include additional operations, fewer operations, different operations, or differently arranged operations than those depicted in FIG. 6. Additionally, or alternatively, two or more of the operations of the process may be performed in parallel.

Figure 7:
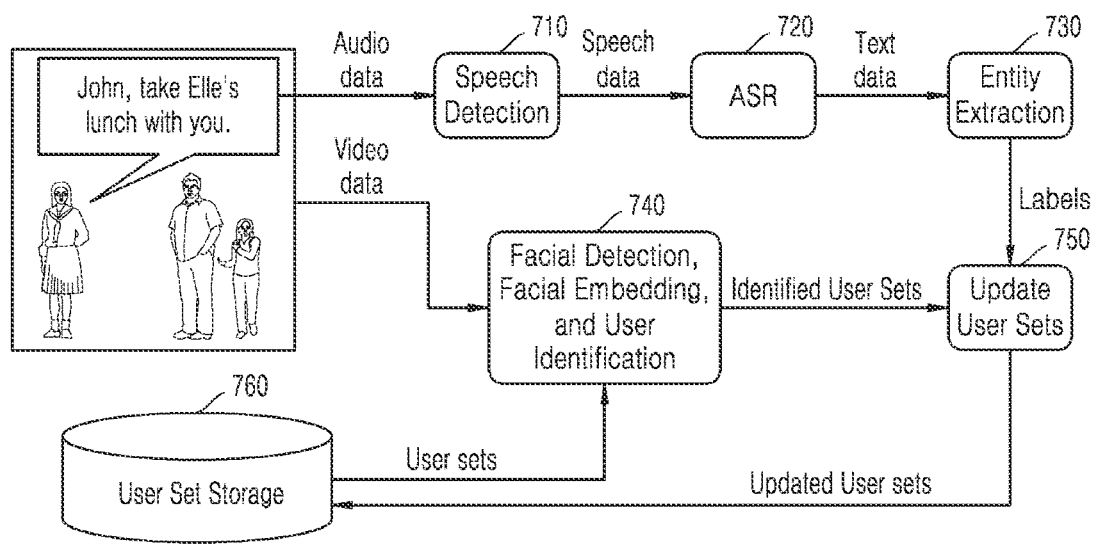
FIG. 7 is a diagram of an example process of updating a user set based on a label associated with a user according to an example embodiment.

FIG. 7 is a diagram of an example process of updating a user set based on a label associated with a user according to an example embodiment.

As shown in FIG. 7, a first user ("User A"), a second user ("User B"), and a third user ("User C") may be disposed within proximity of a user device 210. The first user may address the third user by saying the phrase "John, take Elle's lunch with you."

As shown by reference number 710, the user device 210 may obtain audio data, and perform speech detection using the audio data. As shown by reference number 720, the user device 210 may perform automatic speech recognition (ASR), and convert speech data to text data. As shown by reference number 730, the user device 210 may perform entity extraction using the text data, and identify a set of labels. For example, the user device 210 may identify the labels "John" and "Elle" based on the text data.

As shown by reference number 740, the user device 210 may obtain video data, and perform facial detection using the video data. The user device 210 may generate facial embeddings using the facial data of the respective users, compare the facial embeddings to facial embeddings of stored user sets, and identify user sets corresponding to the users. The identified user sets may include a first user set corresponding to the first user ("User A"), a second user set corresponding to the second user ("User B"), and a third user set corresponding to the third user ("User C").

As shown, the first user set may include the labels "Mom" and "Sarah" that identify the first user; the second user set may include the label "Elle" that identifies the second user; and the third user set may include the labels "John" and "Dad" that identify the third user. Further, as shown, the user sets may include respective confidence scores associated with the respective labels.

As shown by reference number 750, the user device 210 may update the identified user sets based on the identified labels. For example, the user device 210 may refrain from updating the first user set because a label corresponding to the first user was not present in the speech data. Further, the user device 210 may update the second user by adjusting the confidence score associated with the label "Elle" because the label was used in association with the second user. Further still, the user device 210 may update the third user set by adjusting the confidence score associated with the label "John" because the label was used in association with the third user.

Figure 8A:
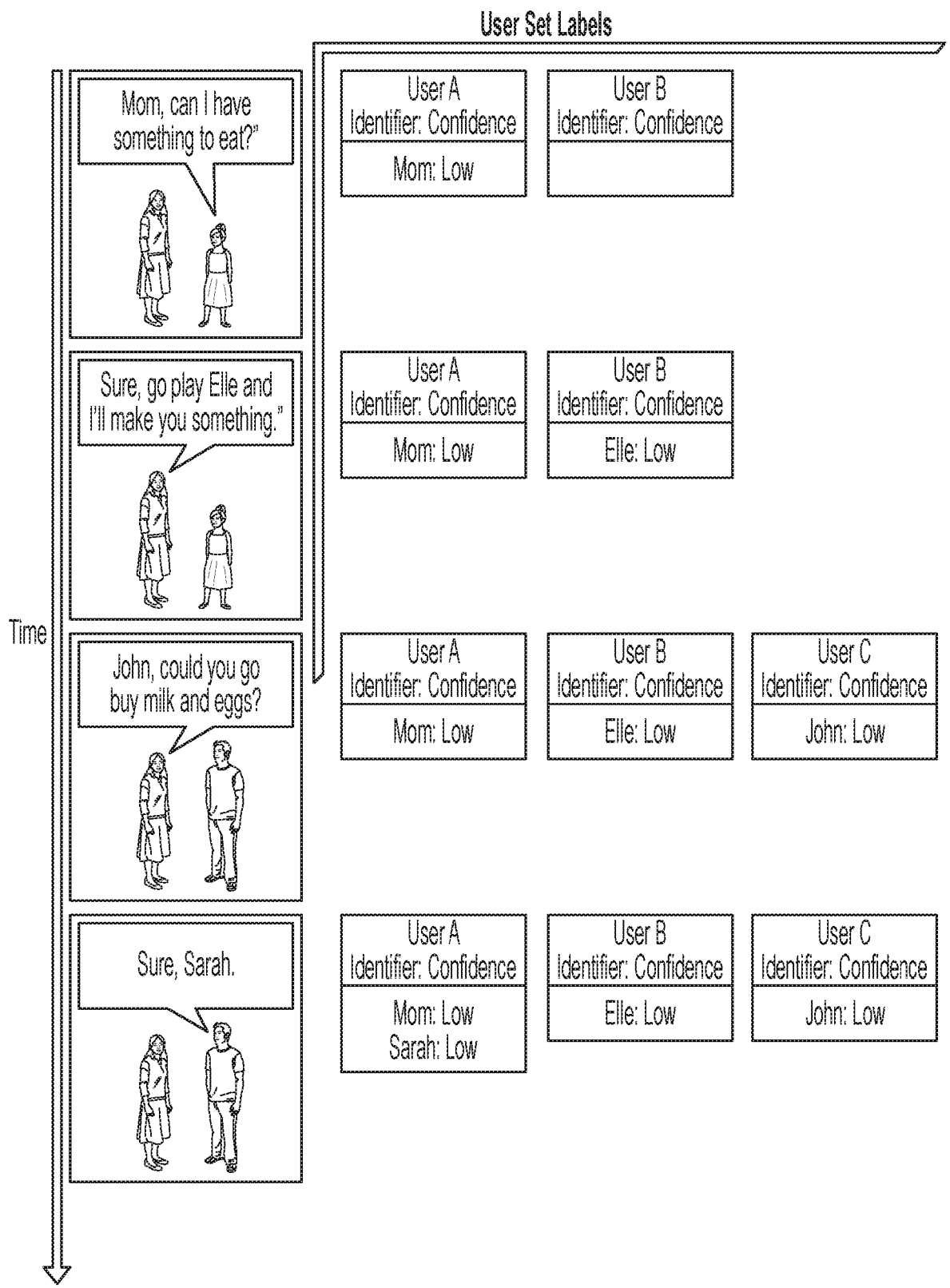
FIGS. 8A and 8B are diagrams of an example process of updating a confidence score associated with a label according to an embodiment.
Figure 8B:
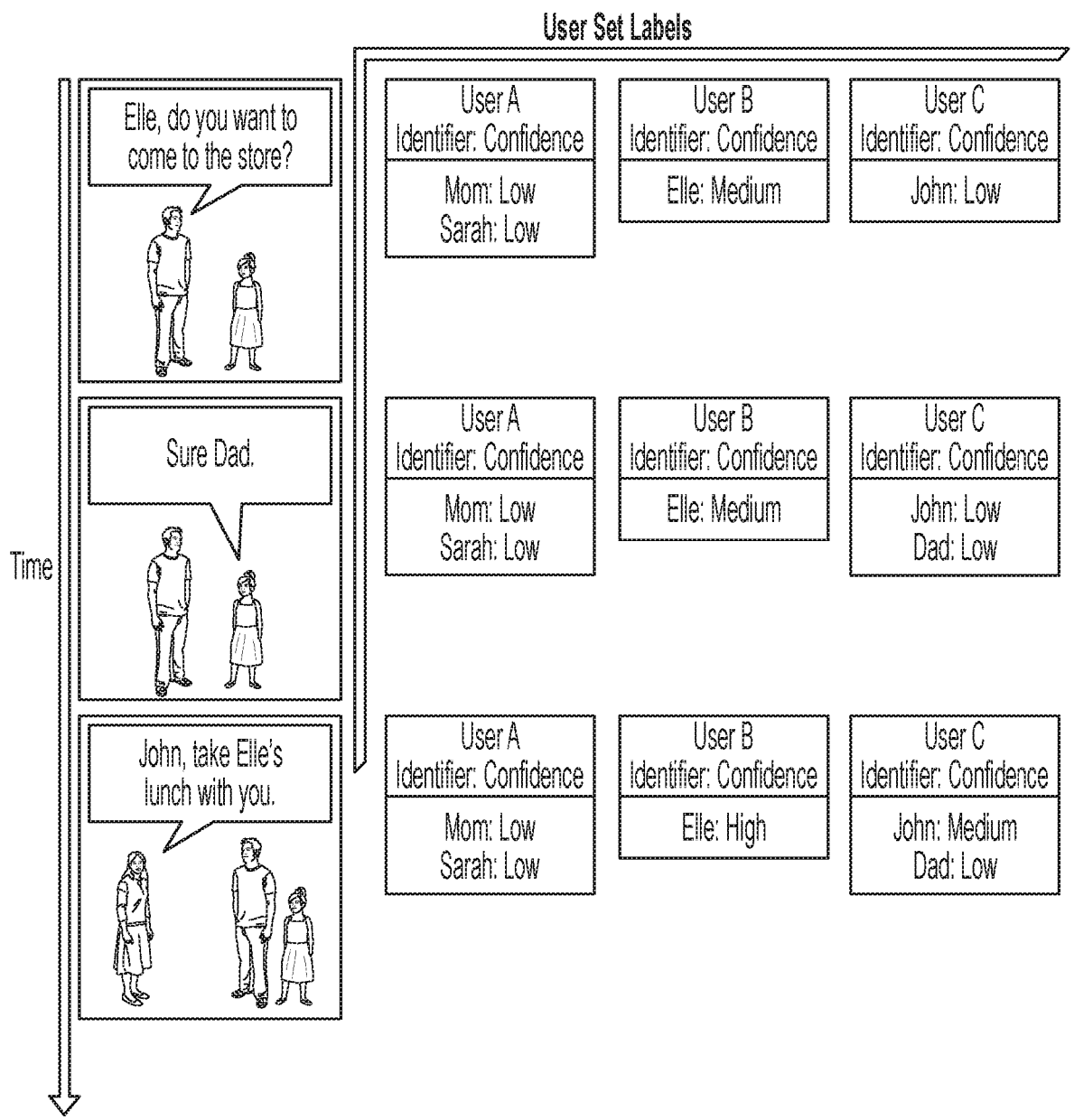

FIGS. 8A and 8B are diagrams of an example process of updating a confidence score associated with a label according to an embodiment.

As shown in FIGS. 8A and 8B, the user device 210 may update user sets by adding labels to the user sets based on the labels being used to identify the users of the user sets. Further, as shown in FIGS. 8A and 8B, the user device 210 may determine an initial confidence score (e.g., "low")

based on the label being first used to identify the user, and update the confidence score based on identifying additional instances in which the label is used to identify the user.

Figure 9:
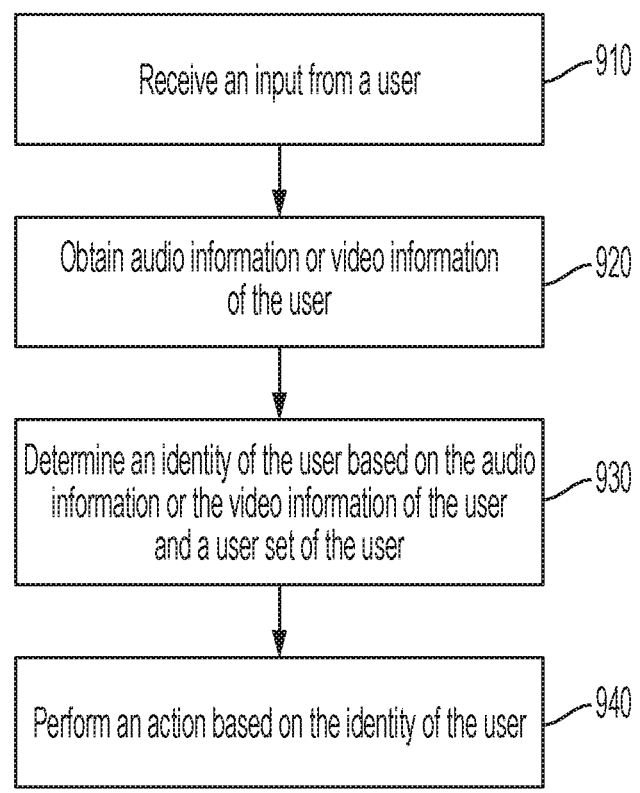
FIG. 9 is a flowchart of an example process for determining an identity of a user and performing an action based on the identity according to an embodiment.

FIG. 9 is a flowchart of an example process for determining an identity of a user and performing an action based on the identity according to an embodiment.

According to an embodiment, one or more operations of FIG. 9 may be performed by the user device 210. According to an embodiment, one or more operations of FIG. 9 may be performed by another device or a group of devices separate from or including the user device 210, such as the server 220 and/or the downstream device 230.

As shown in FIG. 9, the process may include receiving an input from a user (operation 910). For example, the user device 210 may receive a speech input, a video input, a text input, or the like, from a user. The input may be an input for a virtual assistant of the user device 210. For example, the input may be a command, a request, a question, or the like.

As further shown in FIG. 9, the process may include obtaining audio information or video information of the user (operation 920). For example, the user device 210 may obtain, via a sensor (e.g., a microphone, a camera, etc.) of the user device 210, audio information and/or video information of the user.

As further shown in FIG. 9, the process may include determining an identity of the user based on the audio information or the video information of the user and a user set of the user (operation 930).

In some implementations, the user device 210 may identify a user set associated with the user based on the audio information. For example, the user device 210 may identify a label associated with the user based on the audio information, and identify a user set that includes the identified label.

Alternatively, the user device 210 may identify a user set associated with the user based on the video information. For example, the user device 210 may generate, using the facial embedding model, a facial embedding using the video information of the user. Further, the user device 210 may compare the facial embedding with facial embeddings of stored user sets, and determine similarity scores between the facial embedding and the facial embeddings. The user device 210 may identify a user set associated with the user based on the determined similarity scores. For example, the user device 210 may identify a user set having a facial embedding that includes the highest similarity score in relation to the facial embedding, includes a threshold similarity score in relation to the facial embedding, or the like.

The user device 210 may determine an identity of the user based on the identified user set. That is, the user device 210 may determine the identity of the user as corresponding to the user identified by the user set.

As further shown in FIG. 9, the process may include performing an action based on the identity of the user (operation 940). For example, the user device 210 may perform an action associated with a virtual assistant service of the user device 210. The action may be any type of action performed by a virtual assistant of the user device 210. For example, the action may be sending a message, sending an instruction, sending facial data, sending speech data, outputting audio, making a phone call, scheduling a meeting, determining a location of another user device 210, determining a location of another user, ordering an item, or the like. It should be understood that "performing an action" may correspond to substantially any function of the user device 210.

The user device 210 may perform the action, based on the identity of the user. For example, the user device 210 may utilize the identity of the user when performing the action, such that the action is performed in an individualized and user-specific manner.

Although FIG. 9 shows example operations, according to an embodiment, the process may include additional operations, fewer operations, different operations, or differently arranged operations than those depicted in FIG. 9. Additionally, or alternatively, two or more of the operations of the process may be performed in parallel.

Figure 10:
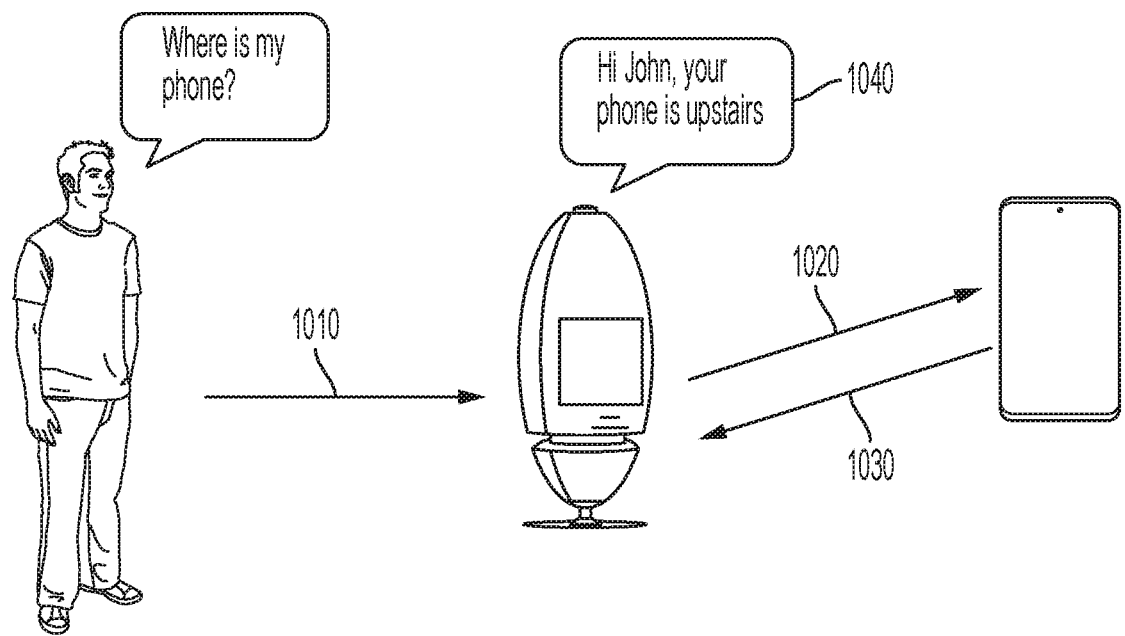
FIG. 10 is a diagram of an example process of determining an identity of a user and performing an action based on the identity according to an embodiment.

FIG. 10 is a diagram of an example process of determining an identity of a user and performing an action based on the identity according to an embodiment.

As shown in FIG. 10, and by reference number 1010, a user device 210 (e.g., a smart hub) may receive a speech input of "Where is my phone?" from a user. The user device 210 may obtain video information of the user, and identify a user set corresponding to the user based on the video information. Further, the user device 210 may determine an identity of the user based on the video information and the user set. In this way, the user device 210 may determine the identity of the user (e.g., "John"), and determine a downstream device 230 (e.g., a smartphone) belonging to the user.

As further shown in FIG. 10, and by reference number 1020, the user device 210 may perform an action based on the identity of the user, such as by providing a request to the downstream device 230 (e.g., the smartphone) of the user that requests location information of the downstream device 230. As shown by reference number 1030, the downstream device 230 may provide a response to the user device 210 that includes location information of the downstream device 230. As further shown in FIG. 10, and by reference number 1040, the user device 210 may perform another action, such as by outputting the notification of "Hi John, your phone is upstairs."

Figure 11:
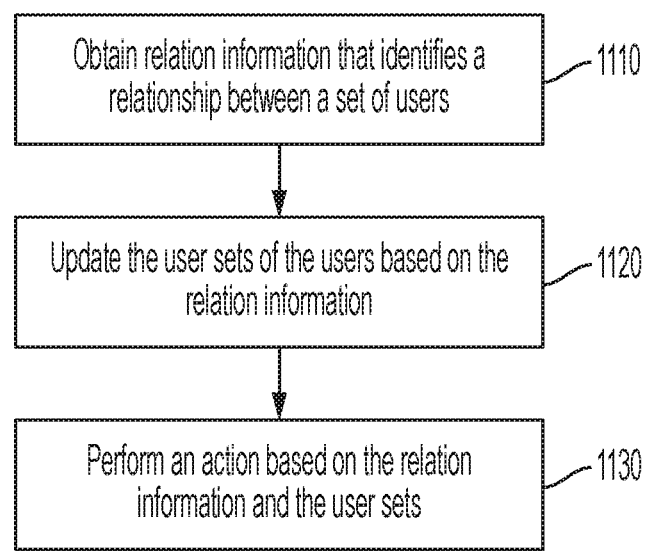
FIG. 11 is a flowchart of an example process of updating a user set based on relation information and performing an action based on the relation information according to an embodiment.

FIG. 11 is a flowchart of an example process of updating a user set based on relation information and performing an action based on the relation information according to an embodiment.

According to an embodiment, one or more operations of FIG. 11 may be performed by the user device 210. According to an embodiment, one or more operations of FIG. 11 may be performed by another device or a group of devices separate from or including the user device 210, such as the server 220 and/or the downstream device 230.

As shown in FIG. 11, the process may include obtaining relation information that identifies a relationship between a set of users (operation 1110). For example, the user device 210 may obtain relation information that identifies a relationship between a set of users (e.g., "mother," "father," "daughter," "son," "sister," "brother," "cousin," "wife," "husband," "boss," "coach," etc.). The user device 210 may obtain the relation information based on a user input, based on a machine learning technique, based on receiving the relation information from another device, or the like.

As further shown in FIG. 11, the process may include updating the user sets of the users based on the relation information (operation 1120). For example, the user device 210 may update user sets of the users associated with the relation information, such that the respective user sets include respective relation information.

As further shown in FIG. 11, the process may include performing an action based on the relation information and the user sets (operation 1130). For example, the user device 210 may perform an action based on the relation information and the user sets.

Although FIG. 11 shows example operations, according to an embodiment, the process may include additional operations, fewer operations, different operations, or differently arranged operations than those depicted in FIG. 11. Additionally, or alternatively, two or more of the operations of the process may be performed in parallel.

Figure 12:
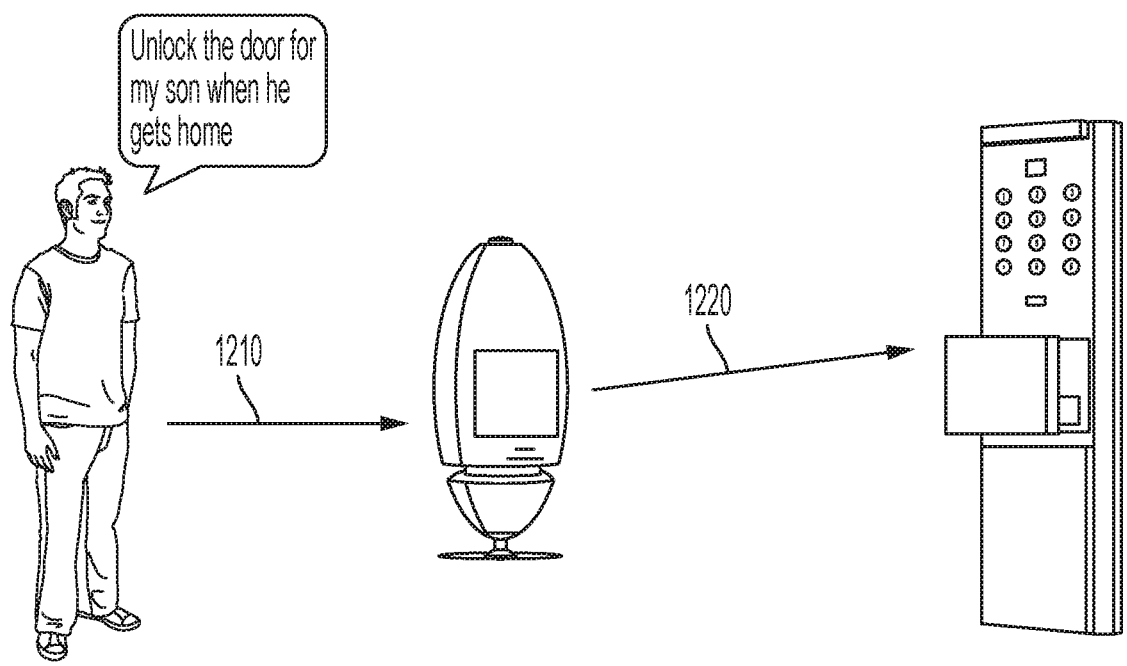
FIG. 12 is a diagram of an example process of updating a user set based on relation information and performing an action based on the relation information according to an embodiment.

FIG. 12 is a diagram of an example process of updating a user set based on relation information and performing an action based on the relation information according to an embodiment.

As shown in FIG. 12, and by reference number 1210, a user device 210 (e.g., a smart hub) may receive a speech input of "unlock the door for my son when he gets home" from a user.

The user device 210 may obtain video information of the user, and identify a user set corresponding to the user based on the video information. Further, the user device 210 may determine an identity of the user based on the video information and the user set. Further still, the user device 210 may identify relation information included in the user set, and identify the son of the user. In this way, the user device 210 may determine the identity of the user (e.g., "John"), and an identity of the son of the user.

As shown by reference number 1220, the user device 210 may perform an action of providing an instruction and facial data of the son of the user to a downstream device 230 (e.g., a smart lock). In this way, the downstream device 230 may obtain video information of the son based on the son being in proximity to the downstream device 230, compare the facial data of the son and the video information, and unlock the door for the son.

In this way, some implementations herein permit a virtual assistant of a user device to determine an identity of a user that issues an input, and perform an action based on the identity and/or relation information.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, by a user device, comprising:
    receiving an input from a user;
    obtaining relation information of the user, audio information of the user obtained via a microphone of the user device, and video information of the user obtained via camera of the user device;
    identifying the user based on the audio information and the video information of the user and a set of facial embeddings and speech embeddings that is correlated with the user, the set of facial embeddings and speech embeddings being generated using a facial embedding model, a speech embedding model, and a sound source localization model; and
    performing an action based on the input and the relation information of the user,
    wherein the sound source localization model is a model that is configured to determine the video information and the audio information that belongs to a same user.

2. The method of claim 1, further comprising:
    generating, using the facial embedding model, the facial embeddings.

3. The method of claim 1, further comprising:
    generating, using the speech embedding model, the speech embeddings.

4. The method of claim 1, further comprising:
    identifying a label associated with the user; and
    correlating the label with the user, based on identifying the label.

5. The method of claim 4, further comprising:
    determining a confidence score associated with the label.

6. The method of claim 1, further comprising:
    generating, using the facial embedding model, a facial embedding of the user, based on the video information of the user;
    comparing the facial embedding of the user and the set of facial embeddings that is correlated with the user; and
    identifying the user, based on comparing the facial embedding of the user and the set of facial embeddings that is correlated with the user.

7. The method of claim 1, further comprising:
    generating, using the speech embedding model, a speech embedding of the user, based on the audio information of the user;
    comparing the speech embedding of the user and the set of speech embeddings that is correlated with the user; and
    identifying the user, based on comparing the speech embedding of the user and the set of speech embeddings that is correlated with the user.

8. A user device comprising:
    a memory configured to store instructions; and
    a processor configured to execute the instructions to:
        receive an input from a user;
        obtain relation information of the user, audio information of the user obtained via a microphone of the user device, and video information of the user obtained via camera of the user device;
        identify the user based on the audio information and the video information of the user and a set of facial embeddings and speech embeddings that is correlated with the user, the set of facial embeddings and speech embeddings being generated using a facial embedding model, a speech embedding model, and a sound source localization model; and perform an action based on the input and the relation information of the user, wherein the sound source localization model is a model that is configured to determine the video information and the audio information that belongs to a same user.

9. The user device of claim 8, wherein the processor is further configured to:

generate, using the facial embedding model, the facial embeddings.

10. The user device of claim 8, wherein the processor is further configured to:

generate, using the speech embedding model, the speech embeddings.

11. The user device of claim 8, wherein the processor is further configured to:

identify a label associated with the user; and correlate the label with the user, based on identifying the label.

12. The user device of claim 11, wherein the processor is further configured to:

determine a confidence score associated with the label.

13. The user device of claim 8, wherein the processor is further configured to:

generate, using the facial embedding model, a facial embedding of the user, based on the video information of the user;

compare the facial embedding of the user and the set of facial embeddings that is correlated with the user; and identify the user, based on comparing the facial embedding of the user and the set of facial embeddings that is correlated with the user.

14. The user device of claim 8, wherein the processor is further configured to:

generate, using the speech embedding model, a speech embedding of the user, based on the audio information of the user;

compare the speech embedding of the user and the set of speech embeddings that is correlated with the user; and identify identity of the user, based on comparing the speech embedding of the user and the set of speech embeddings that is correlated with the user.

15. A non-transitory computer-readable medium storing instructions that, when executed, cause at least one processor of a user device to:

receive an input from a user;

obtain relation information of the user, audio information of the user obtained via a microphone of the user device, and video information of the user obtained via camera of the user device;

identify the user based on the audio information and the video information of the user and a set of facial embeddings and speech embeddings that is correlated with the user, the set of facial embeddings and speech embeddings being generated using a facial embedding model, a speech embedding model, and a sound source localization model; and perform an action based on the input and the relation information of the user, wherein the sound source localization model is a model that is configured to determine the video information and the audio information that belongs to a same user.

16. The non-transitory computer-readable medium of claim 15, wherein the instructions further cause the at least one processor to:

generate, using the facial embedding model, the facial embeddings.

17. The non-transitory computer-readable medium of claim 15, wherein the instructions further cause the at least one processor to:

generate, using the speech embedding model, the speech embeddings.

18. The non-transitory computer-readable medium of claim 15, wherein the instructions further cause the at least one processor to:

identify a label associated with the user; and correlate the label with the user, based on identifying the label.

19. The non-transitory computer-readable medium of claim 15, wherein the instructions further cause the at least one processor to:

generate, using the facial embedding model, a facial embedding of the user, based on the video information of the user;

compare the facial embedding of the user and the set of facial embeddings that is correlated with the user; and identify the user, based on comparing the facial embedding of the user and the set of facial embeddings that is correlated with the user.

20. The non-transitory computer-readable medium of claim 15, wherein the instructions further cause the at least one processor to:

generate, using the speech embedding model, a speech embedding of the user, based on the audio information of the user;

compare the speech embedding of the user and the set of speech embeddings that is correlated with the user; and identify identity of the user, based on comparing the speech embedding of the user and the set of speech embeddings that is correlated with the user.

* * * * *